US007229350B2

(12) United States Patent
Baerlocher et al.

(10) Patent No.: US 7,229,350 B2
(45) Date of Patent: *Jun. 12, 2007

(54) GAMING DEVICE WITH A BONUS SCHEME HAVING REPEATED SELECTION OF VALUE SETS WITH OPTION TO SAVE VALUES

(75) Inventors: Anthony J. Baerlocher, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 980 days.

This patent is subject to a terminal disclaimer.

(21) Appl. No.: 10/231,639

(22) Filed: Aug. 30, 2002

(65) Prior Publication Data

US 2002/0198036 A1 Dec. 26, 2002

Related U.S. Application Data

(63) Continuation-in-part of application No. 09/684,533, filed on Oct. 6, 2000, now Pat. No. 6,464,582.

(51) Int. Cl.
*A63F 13/00* (2006.01)

(52) U.S. Cl. .................................... 463/20; 273/143 R

(58) Field of Classification Search ............ 463/16–20; 273/138.1, 139, 143 R, 271
See application file for complete search history.

(56) References Cited

U.S. PATENT DOCUMENTS 2,743,108 A * 4/1956 Sanders ...................... 273/269
3,904,207 A 9/1975 Gold
4,695,053 A * 9/1987 Vazquez et al. .............. 463/18
4,775,155 A 10/1988 Lees
4,836,553 A 6/1989 Suttle et al.
5,205,555 A 4/1993 Hamano
5,382,025 A 1/1995 Sklansky et al.
5,395,119 A 3/1995 Jacob et al.
5,397,128 A 3/1995 Hesse et al.
5,511,781 A 4/1996 Wood et al.
5,536,016 A 7/1996 Thompson
5,542,669 A 8/1996 Charron et al.
5,639,089 A 6/1997 Matsumoto et al.

(Continued)

FOREIGN PATENT DOCUMENTS

EP 0874337 A1 10/1998

(Continued)

OTHER PUBLICATIONS

Top Dollar Brochure written by IGT, published in 1999.

(Continued)

*Primary Examiner*—Scott Jones
*Assistant Examiner*—Sean Sprigg
(74) *Attorney, Agent, or Firm*—Bell, Boyd & Lloyd LLP

(57) ABSTRACT

A gaming device with a bonus scheme which includes a plurality of sets and associated sets. The gaming device enables the player to select a set. The player can accept an award associated with the selected set or instead select another set which may or may not include a value in the selected set. This type of bonus scheme adds excitement to bonus rounds and increases player entertainment.

72 Claims, 15 Drawing Sheets

U.S. PATENT DOCUMENTS 5,755,619 A 5/1998 Matsumoto et al.
5,810,360 A 9/1998 Srichayaporn
5,816,915 A * 10/1998 Kadlic ........................ 463/13
5,823,873 A 10/1998 Moody
5,893,718 A 4/1999 O'Donnell
5,911,419 A 6/1999 Delaney et al.
5,935,002 A 8/1999 Falciglia
5,944,315 A 8/1999 Mostashari
5,951,012 A 9/1999 Feola
5,976,016 A 11/1999 Moody et al.
5,984,310 A 11/1999 English
5,997,401 A 12/1999 Crawford
6,007,066 A 12/1999 Moody
6,015,346 A 1/2000 Bennett
6,019,369 A 2/2000 Nakagawa et al.
6,029,976 A 2/2000 Brunelle
6,056,642 A 5/2000 Bennett
6,065,753 A 5/2000 Morosky
6,089,976 A 7/2000 Schneider et al.
6,093,102 A 7/2000 Bennett
6,102,798 A * 8/2000 Bennett ....................... 463/16
6,113,103 A 9/2000 Mostashari
6,126,542 A 10/2000 Fier
6,135,884 A 10/2000 Hedrick et al.
6,142,873 A 11/2000 Weiss et al.
6,159,096 A 12/2000 Yoseloff
6,159,098 A 12/2000 Slomiany et al.
6,179,291 B1 1/2001 Vancura
6,189,888 B1 2/2001 Brunelle
6,270,079 B1 8/2001 Chamberlain
6,273,424 B1 8/2001 Breeding
6,311,979 B1 11/2001 Andrews
6,342,007 B1 1/2002 Wood et al.
6,398,644 B1 * 6/2002 Perrie et al. .................. 463/18
6,406,020 B1 6/2002 Reed
6,428,412 B1 8/2002 Anderson et al.
6,435,506 B1 8/2002 Piccoli
6,446,971 B1 9/2002 Baranauskas
6,464,582 B1 * 10/2002 Baerlocher et al. ........... 463/20
6,511,068 B1 1/2003 Sklansky et al.
6,523,829 B1 2/2003 Walker et al.
6,540,230 B1 4/2003 Walker et al.
6,561,897 B1 5/2003 Bourbour et al.
6,881,146 B2 4/2005 Anderson et al.
2003/0134242 A1 7/2003 Hart et al.

FOREIGN PATENT DOCUMENTS

EP 0945837 A2 9/1999
EP 0984408 A2 3/2000
EP 0984409 A2 3/2000
GB 2 137 392 A 10/1984
GB 2 191 030 A 12/1987
WO WO 00/12186 3/2000

OTHER PUBLICATIONS

Fortune Cookie Brochure written by IGT, published in 2000.
Take Your Pick Brochure written by Anchor Games, published in 1999.
"Slot Machines, A Pictorial History of the First 100 years; Draw Poker Dice (pp. 74-75)", fifth edition, 1997, in or before Dec. thereof.

* cited by examiner

100

FIG.3C

| | | | |
|---|---|---|---|
| 95 | 5 | 45 | 15 |
| 25 | 70 | 50 | 65 |
| 10 | 80 | 85 | 5 |
| 55 | 5 | 30 | 100 |

100

FIG.3D

| | | | |
|---|---|---|---|
| | | | |
| 25 | 70 | 50 | 65 |
| | | | |
| | | | |

100

FIG.3E

| | | | |
|---|---|---|---|
| | 5 | | |
| | 70 | | |
| | 80 | | |
| | 5 | | |

100

FIG.3F

| | | | |
|---|---|---|---|
| | | | |
| | | | |
| 10 | 80 | 85 | 5 |
| | | | |

GAMING DEVICE WITH A BONUS SCHEME HAVING REPEATED SELECTION OF VALUE SETS WITH OPTION TO SAVE VALUES

PRIORITY CLAIM

This application is a continuation-in-part of and claims the benefit of U.S. patent application Ser. No. 09/684,533, filed Oct. 6, 2000 now U.S. Pat. No. 6,464,582 which is hereby incorporated by reference in its entirety and relied upon.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having a bonus scheme which enables a player to make repeated selections of value sets with the option of saving values.

BACKGROUND OF THE INVENTION

Many existing gaming machines, such as traditional slot machines, include bonus rounds. Typically, a bonus round begins when the player reaches a bonus triggering event in the primary game of the gaming device. In slot machines with reels, the triggering event usually occurs when the player reaches a predetermined combination of symbols on the reels. Usually, the bonus scheme provides the player with an opportunity to gain a bonus value before the bonus round terminates.

Many of these bonus schemes involve a player making selections and receiving an award or no award depending upon the player's selections. Certain bonus schemes include an offer and acceptance feature. For instance, the gaming device provides the player with three selections. The selections are each associated with various values. After the player makes the first selection and the gaming device reveals the associated value, the player can accept or reject this value. If the player rejects this value, the player can make another selection. This process continues until there are no more selections or until the gaming device terminates the bonus round. If a player rejects a value, the player cannot go back and recover this value. This type of bonus scheme was included in a game entitled "TOP DOLLAR®" which is manufactured by IGT. These types of offer and acceptance bonus schemes only enable a player to have a limited amount of control over a player's ultimate reward.

Another type of selection bonus will give the player two values that can be added or multiplied together to create an offer. The player may decide to keep one of the values and reject the other. The rejected value will then be replaced with a substitute value. The substitute value is then added or multiplied with the kept value from the first offer to create a second offer. This can occur a pre-determined number of times before the player will receive the displayed offer. This type of bonus scheme was included in a game "TAKE YOUR PICK®" manufactured by IGT. This type of bonus does not give the player many options.

To increase player enjoyment and excitement, it is desirable to provide players with new bonus schemes for gaming devices.

SUMMARY OF THE INVENTION

The present invention overcomes the above shortcomings by providing a gaming device having a bonus scheme which includes a plurality of value sets. The value sets are sets or rosters of numbers. Preferably, the numbers vary in magnitude. Each value set is associated with a value set symbol. A value set symbol can be a single image, a plurality of images, or a configuration of value symbols.

In operation, the gaming device displays a plurality of value set symbols to the player. The player chooses one of the value set symbols. The gaming device then reveals the value set associated with the value set symbol. For instance, after the player makes a selection, the gaming device may reveal the values twenty-five, ten, five and one hundred. The gaming device may then enable the player to accept the sum of these values or instead save one of these values and make a selection of another value set which includes the saved value. The term save, as used herein, includes reserving or designating something for future use. This process continues until the bonus scheme terminates. The bonus scheme can terminate when any predetermined event or sequence of events occurs, as determined by the gaming device. Preferably, the bonus scheme terminates after the player has made a predetermined number of selections. It should be appreciated that the bonus scheme of the present invention can be adapted so that the player can save a plurality of values. Furthermore, the bonus scheme of the present invention can be adapted so that a player can accept and receive one or more of the values in a value set instead of having to receive the sum of the values in a value set.

In one preferred embodiment, the value set symbol is a configuration of value symbols. The value symbols are displayed on a grid which includes a plurality of locations. The configurations are preferably in the form of a straight line connecting value symbol to value symbol from one side of the grid to another side of the grid. These configurations include horizontal, vertical and diagonal lines. It should be appreciated, however, that a configuration can include any shape, any form or any arrangement of value symbols, in any orderly or disorderly fashion.

Since the value symbols and configurations are included within a grid, each configuration includes one value symbol (and one value) in common with another configuration which is identical in location and value. As such, when a player selects an initial configuration, the player has the opportunity to select a different configuration which includes a value symbol and value which is identical to one value symbol and value in the rejected configuration. In operation, the gaming device displays the grid of locations and value symbols to the player. The gaming device, preferably at the same time, informs the player of the various configurations which the player can select. The player then selects a configuration and the gaming device reveals the values associated with each of the value symbols in that configuration. The player then has the opportunity to accept the sum of the values in that configuration and receive an award equal to that sum. Alternatively, the player can take note of the highest value or any other value in that configuration and select a different configuration which includes that value. This process continues until the bonus scheme terminates. Preferably, the bonus scheme terminates after the player has made a predetermined number of selections.

In another embodiment, the gaming device displays a plurality of value set symbols to the player. Here, the value set symbol is a single image. The player can select any one of the value set symbols. After the player selects an initial value set symbol, the gaming device displays the values associated with that value set symbol to the player. Then, the gaming device provides the player with the opportunity to accept the sum of these values and receive an award accordingly or the player can save one of these values and make a different selection which will include the saved value. In this embodiment, the gaming device preferably provides predetermined values for the value sets for the various value set symbols at the outset. However, after the player rejects an initial selection and saves a value, the gaming device then changes the values in the remaining value sets so that each value set includes the saved value. This bonus scheme preferably terminates after the player has made a predetermined number of selections.

The bonus scheme of the present invention involves a plurality of value sets and associated value set symbols. The player has the opportunity to select one or more of the value set symbols and accept or reject an award associated with such value set symbols. If a player rejects an award, the player can save a value from the rejected value set and receive that value in the player's next selection. This type of bonus scheme provides players with a sense of control in the ultimate award they will receive. This sense of control adds excitement and entertainment to gaming devices.

It is therefore an object of the present invention to provide a gaming device with a bonus scheme which enables a player to make repeated selections of value sets with the option of saving values.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 3A through 3F are top plan views of various stages of a bonus scheme found in one embodiment of the present invention;

DETAILED DESCRIPTION OF THE INVENTION

Gaming Device and Electronics

Figure 1A:
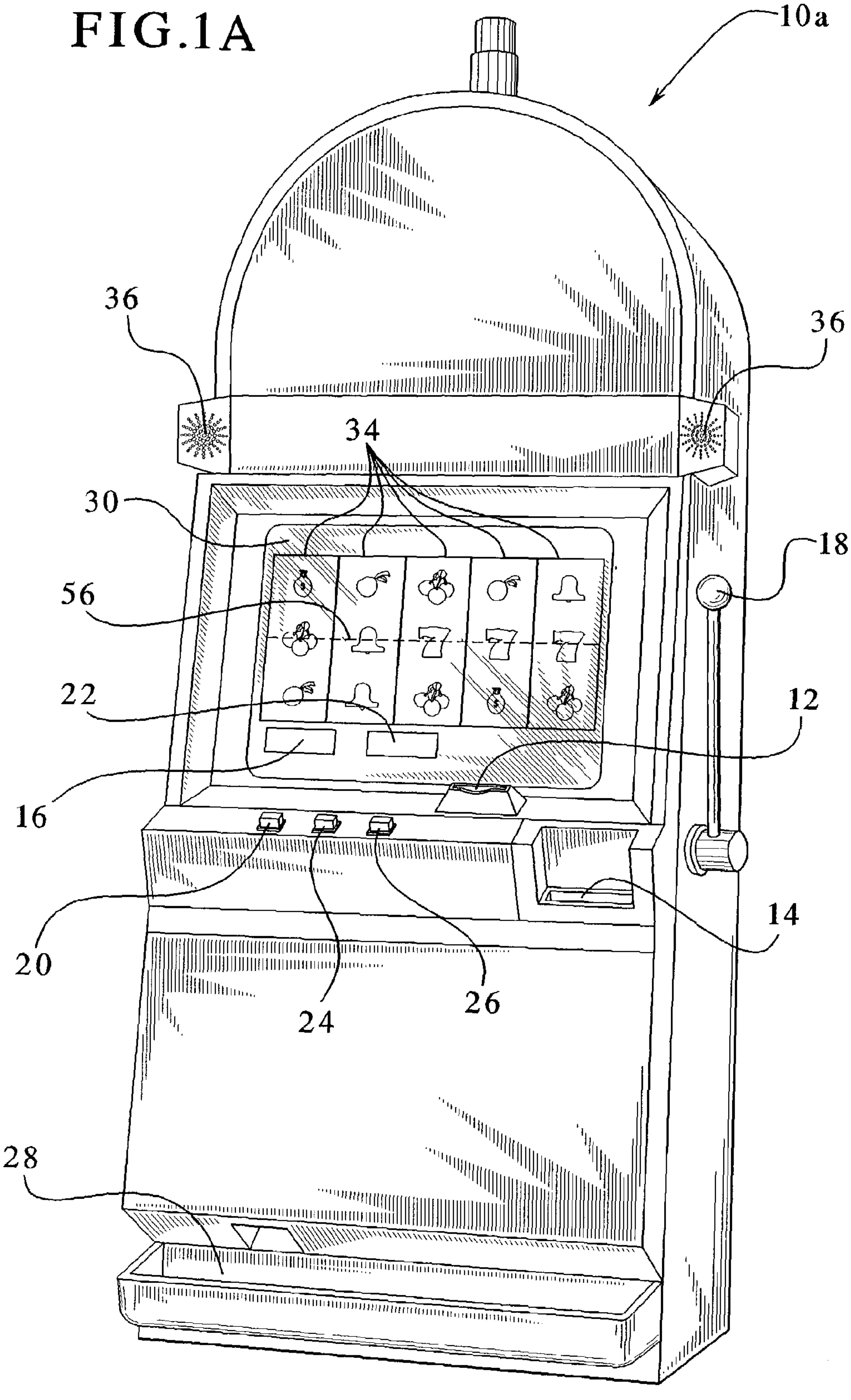
FIG. 1A is a perspective view of one embodiment of the gaming device of the present invention.
Figure 1B:
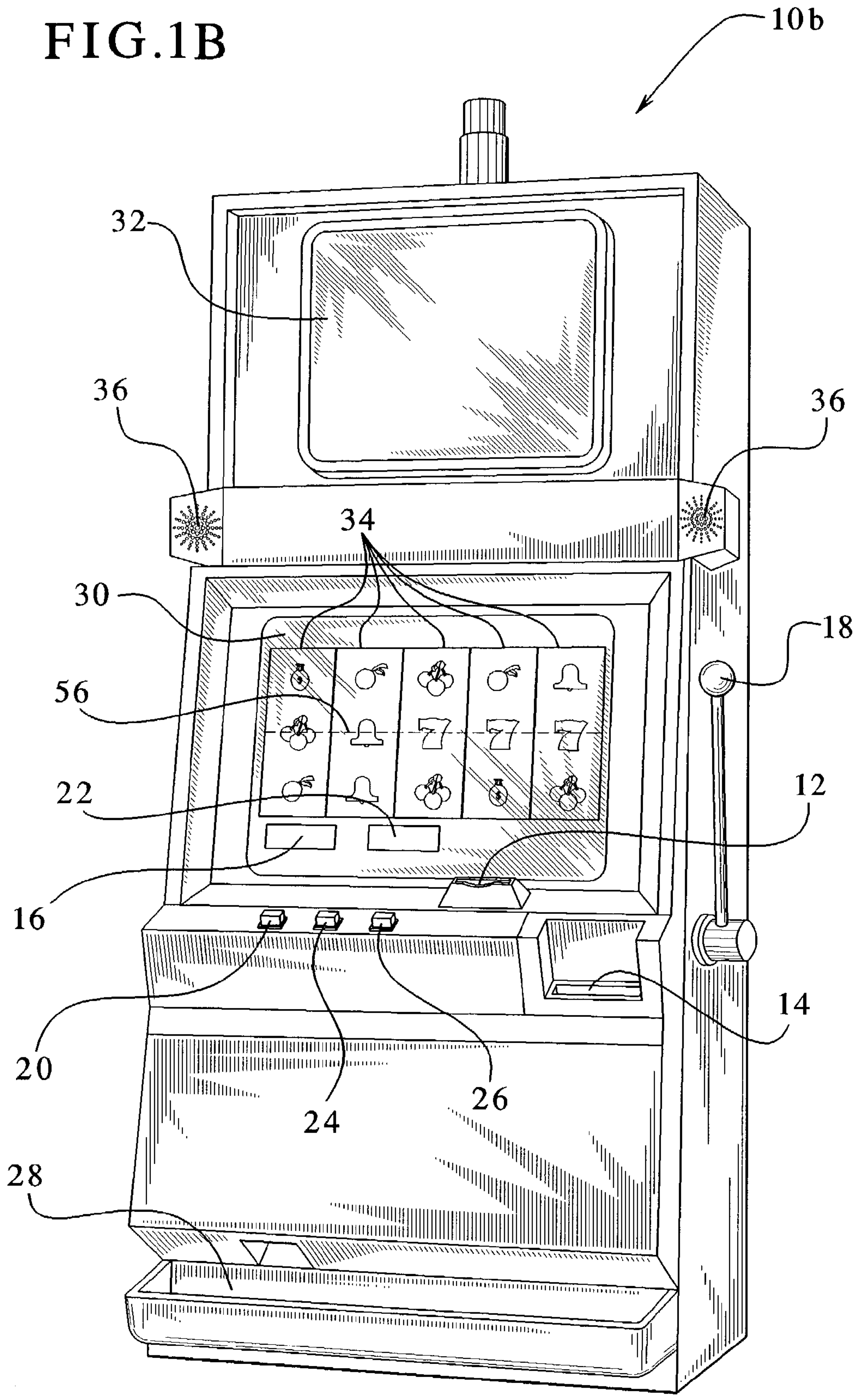
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device

10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sifting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

A player may cash out and thereby receive a number of coins corresponding to the number of remaining credits by pushing a cash out button 26. When the player cashes out, the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
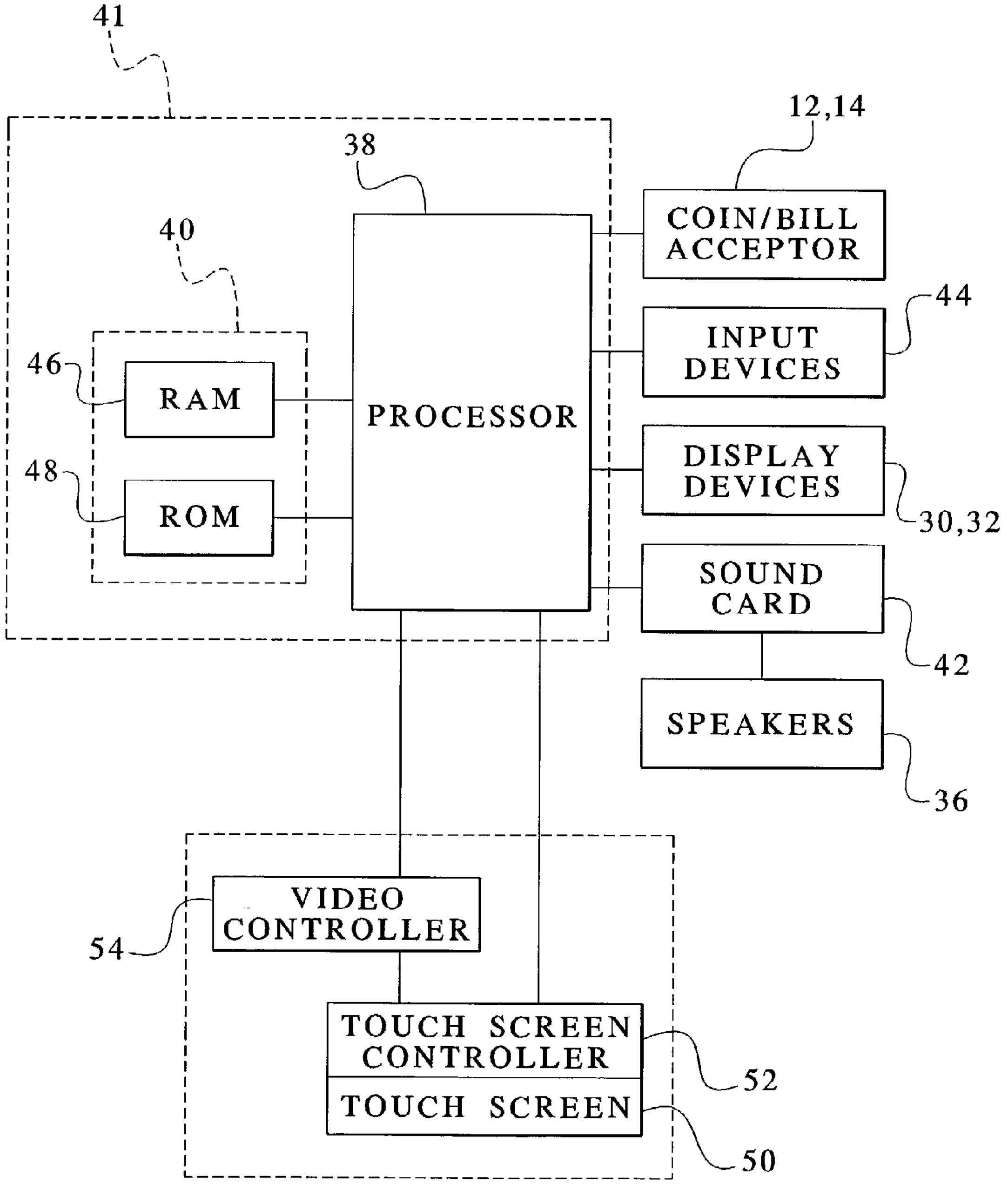
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a data network 41 or network server for communication to a playing station such as over a local area network (LAN), wide area network (WAN), Internet connection, microwave link, and the like. In addition, the gaming device processor 38 can communicate with a server over a data network 41. For example, the processor 38 can exchange game data with a gaming facility server by communicating with such server over a gaming facility network. The processor 38 and memory device 40 is generally referred to herein as the computer or controller.

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Bonus Scheme

If a player achieves a bonus triggering or qualifying condition while playing the game, the gaming device automatically initiates the bonus round of the present invention. The bonus scheme of the present invention includes a plurality of value sets. Each value set is associated with a value set symbol. The gaming device enables the player to select one or more of the value set symbols. After making a selection, the gaming device reveals the values associated with the value set symbol. The player then may accept one or more of these values or the sum of these values, and the bonus scheme will then terminate. The player may also reject such values and make another selection. However, the gaming device enables the player to save one or more of the values revealed to the player in the rejected selection. The gaming device will provide the saved value or values to the player in the subsequent selection.

For instance, the player's initial selection may reveal the values two, ten and twenty. The player may accept these values and receive an award equal to the sum of these values which would be thirty-two, or the player may save value twenty and make a different selection. When the player makes the next selection, the values associated with the value set in that selection will include the value twenty and may include any other two values, such as four and thirty. Here, as before, the player can accept the sum of these values, which would be fifty-four, or save any one of these values, and make another selection. If the player decides to save value thirty, the gaming device will include this value in the next value set selected by the player. In this example, in the final selection the gaming device reveals the values thirty, two and four. The gaming device will provide the player with the sum of these values which is thirty-six as an award. Note that had the player chosen to accept the second selection, the player would have obtained the greatest value of fifty-four. However, in this case the player's strategy was to save the highest value associated with each selection and reject the award associated with each selection. In one preferred embodiment of the present invention, the game only enables the player to make the first two selections, whereby the player receives the sum of the values in the second value set selection.

Figure 3A:
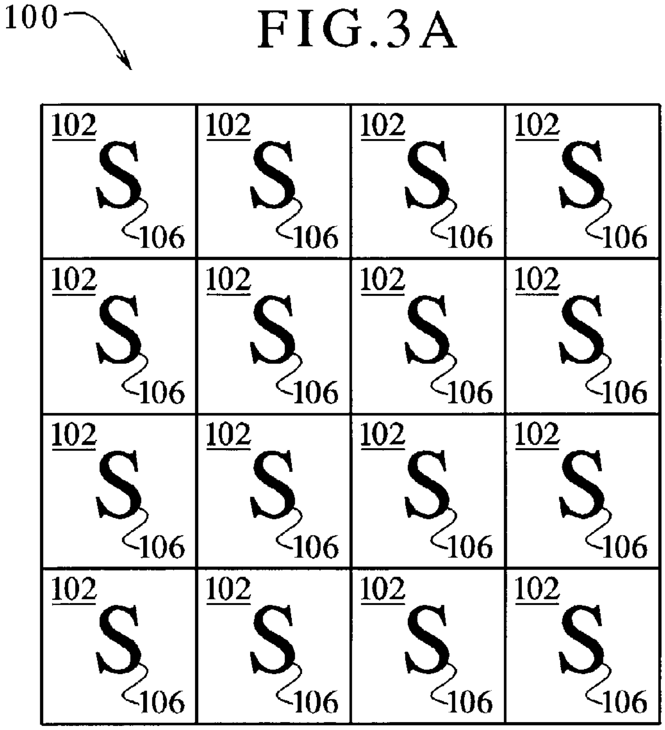
Figure 3B:
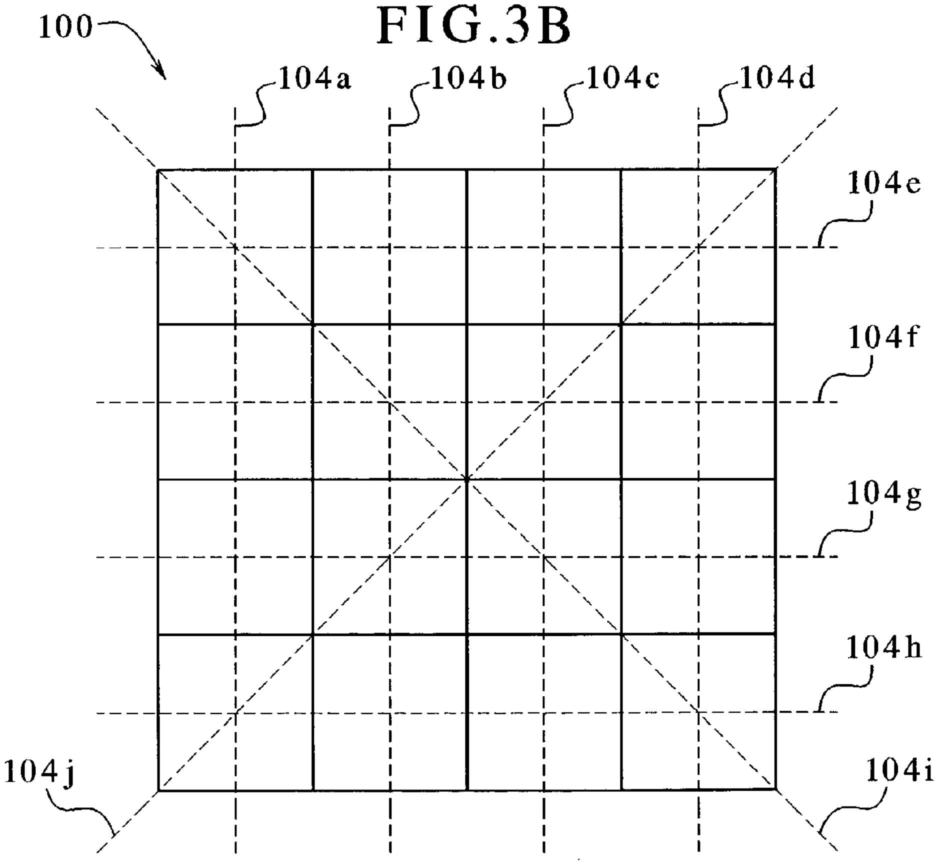

The bonus scheme of the present invention can include any suitable type of bonus set symbol and any suitable process, technique, program or formula which enables a player to make a selection of a value set and to save one or more of the values revealed in that value set and to then make a different selection which includes the saved value or values, in addition to other values. With reference to FIGS. 3A and 3B, in one preferred embodiment, this function is accomplished by displaying the value sets 100 in a plurality of locations 102. The value set symbols 106 are displayed in a plurality of configurations 104 identified as 104*a* through 104*j*, as shown in FIG. 3B. Each value set symbol includes a plurality of value symbols 106. The value symbols 106 are displayed on a plurality of predetermined locations 102, as shown in FIG. 3A. The locations 102 can be arranged in any predetermined manner, pattern or fashion, although preferably they are arranged in a grid, as shown in FIG. 3A. The value set symbols are preferably configured in various straight lines extending from one side of the grid to another side of the grid, as shown in FIG. 3B. Preferably, the configurations include the horizontal, vertical and diagonal lines displayed in FIG. 3B. It should be appreciated that this embodiment can include alternative configurations including, but not limited to, lines which are partially vertical, horizontal or diagonal, curved lines, partial or full circles, ovals or polygons or any other pattern which includes predetermined locations 102 for the value symbols 106.

Figure 4:
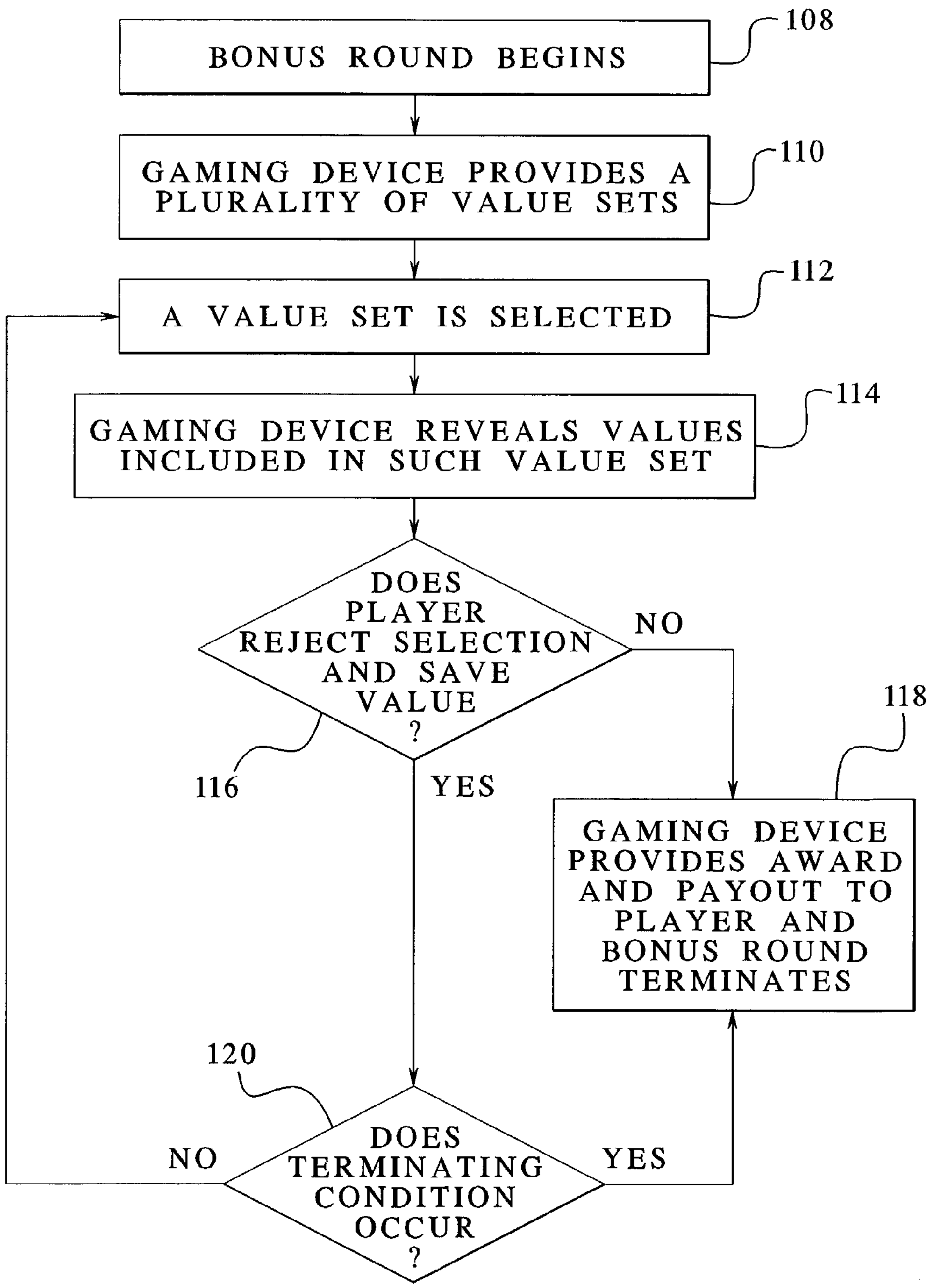
FIG. 4 is a flow diagram of one embodiment of the present invention.
Figure 5:
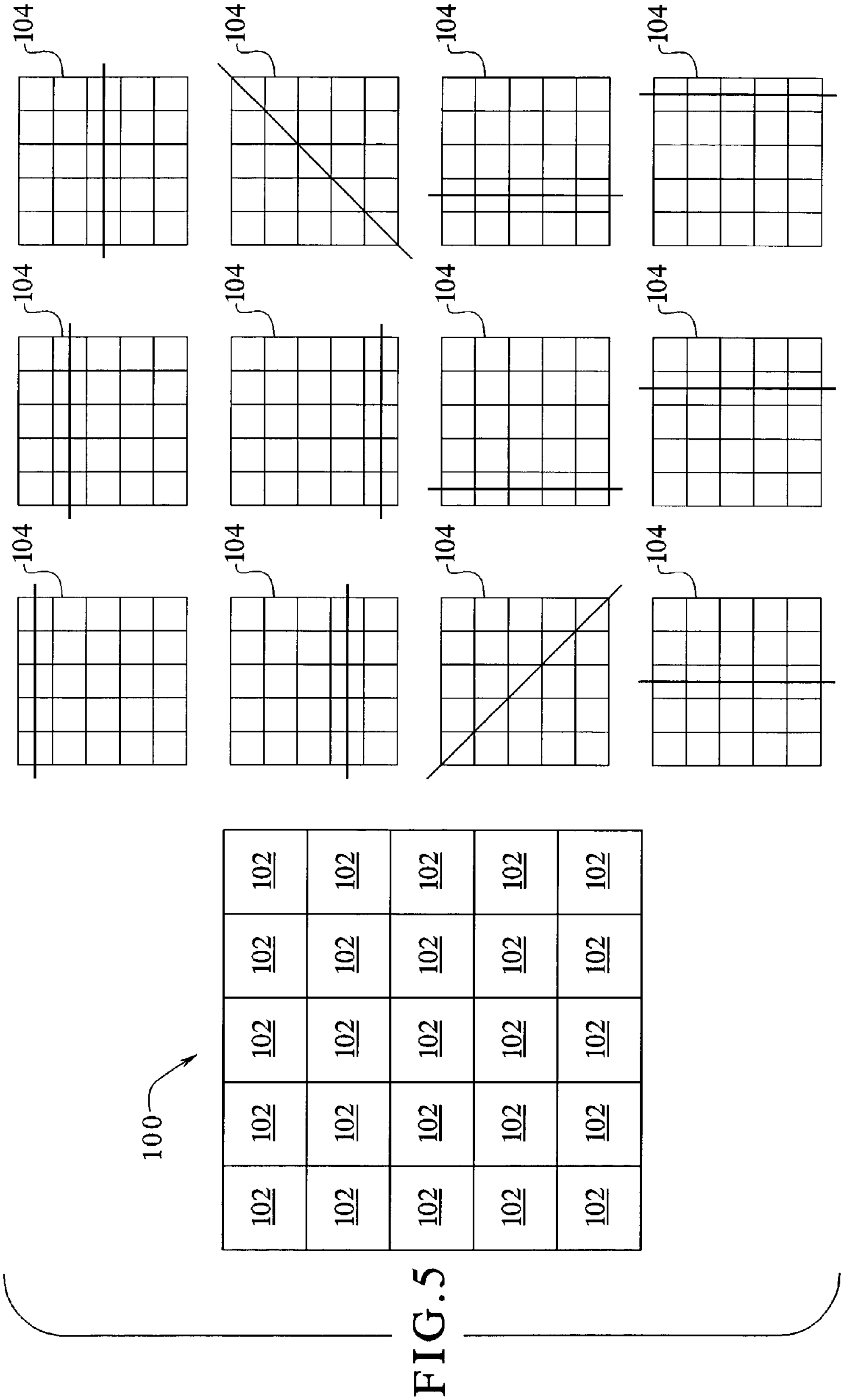
FIG. 5 is a top plan view of one embodiment of the present invention.

Each value set symbol 104 includes a plurality of value symbols 106 and each value symbol 106 is associated with a value. With reference to FIG. 4, the bonus round begins as indicated by block 108 and the gaming device 10 provides a plurality of value sets 100 as indicated by block 110. In this preferred embodiment, the gaming device 10 displays the value sets 100 to the player in the form of a grid as shown in FIGS. 3A through 3F. The gaming device informs the player of the various value set symbols 104 which the player can select. The gaming device can provide this information to the player in the manner shown in FIG. 3B or in any other manner such as that shown in FIG. 5. In FIG. 5, the gaming device displays the value sets 100 at a plurality of locations 102 on the grid. Adjacent to the grid, the gaming device displays a plurality of value set symbols 104, relatively small in size. These value set symbols 104 display various configurations which the player can select.

After the gaming device informs the player of the various value set symbols 104*a* through 104*j*, the player selects an initial value set 100 as indicated by block 112 in FIG. 4. The player makes a selection by choosing a value set symbol and activating an input device, such as a play button 20, thereby selecting the desired value set symbol. Next, the gaming device reveals the values associated with the chosen value set symbol, as indicated by block 114 in FIG. 4. In the example shown in FIGS. 3B through 3F, the gaming device provided the masked values for the value sets 100 as shown in FIG. 3C. The player selected value set symbol 104*f*, and the gaming device revealed the values twenty-five, seventy, fifty and sixty-five as shown in FIG. 3D.

At this point the player has the option of accepting or rejecting this first selection. If the player accepts the values associated with this first selection, the gaming device provides the player with an award equal to the sum of those values, as indicated by diamond 116 and block 118 in FIG. 4. If the player does not accept the values associated with this selection, the player can save at least one value as indicated by diamond 116. As discussed earlier, by saving a value the player can receive the saved value in the next value set 100 selected by the player. With reference to FIG. 3D, in this example, the player chose to save value seventy. In order to do so, the player's next selection, shown in FIG. 3E, must be a value set symbol which includes value seventy. Referring back to FIG. 4, after rejecting the selection and saving a value, a terminating condition may or may not occur, as indicated by diamond 120. A terminating condition preferably occurs when the player makes a predetermined number of selections, as discussed below. If a terminating condition does not occur, the player can make another selection. After making a subsequent selection the gaming device reveals the values associated with that selection. Again, the player can accept the values associated with the selection or save a value and proceed to make another selection. This process repeats itself until the player accepts an award or until a terminating condition occurs. In the example shown in FIGS. 3B through 3F, the player chose to make a second and third selection as shown in FIGS. 3E and 3F. Here, the player decided to save the value eighty revealed in FIG. 3E by selecting a different value set symbol which included the location 102 corresponding to the location of value eighty in value set symbol 104*b*. Eventually, a terminating condition will occur as indicated by diamond 120 in FIG. 4. A terminating condition can be any predetermined event or sequence of events which results in the termination of the bonus round. Preferably, the terminating condition is a predetermined number of selections made by the player. With reference to the example illustrated in FIGS. 3B through 3F, the player had two opportunities to accept a value sum corresponding to different value sets 100. Then the bonus round terminated, and the player received an award equal to the sum of the values revealed in FIG. 3F. Here, the player's strategy was to reject all selections and seek additional selections which included the highest value provided to the player in the prior selection. It should be appreciated that the player can save any value, not necessarily the highest one. It should also be appreciated that the player can reject a selection and not save a value.

In another embodiment shown in FIGS. 6A through 6D, the gaming device provides the player with value sets 100 in the form of value set symbols 104*k*, 104*l* and 104*m*. The gaming device enables the player to select one of these value set symbols 104*k* through 104*m*. In the example shown in FIG. 6B, the player selected value set symbol 104*k*, and the gaming device revealed values five, forty and thirty. At this point, the player can accept the sum of these values or save one of these values and make an additional selection.

Figure 6A:
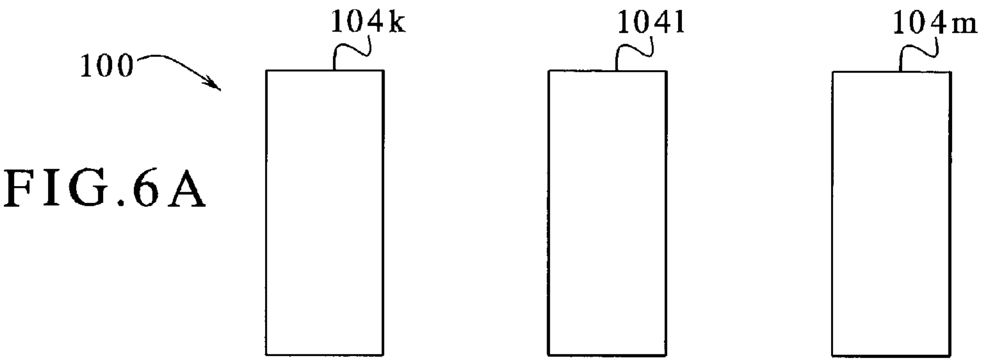
FIGS. 6A through 6D are top plan views of various stages of a bonus round in one embodiment of the present invention.
Figure 6B:
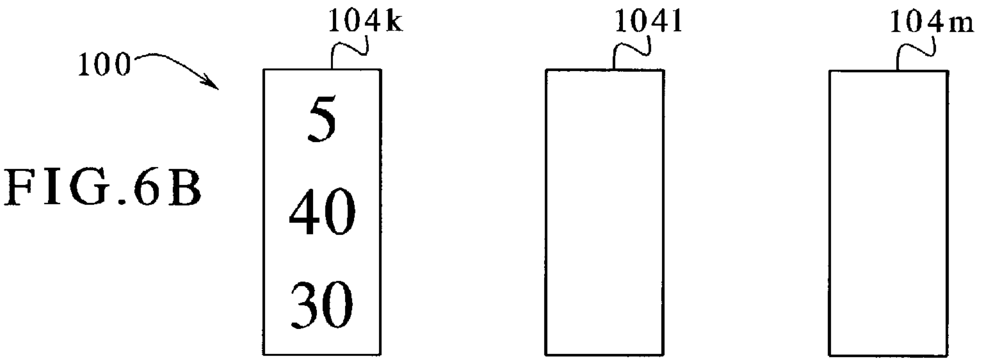
Figure 6C:
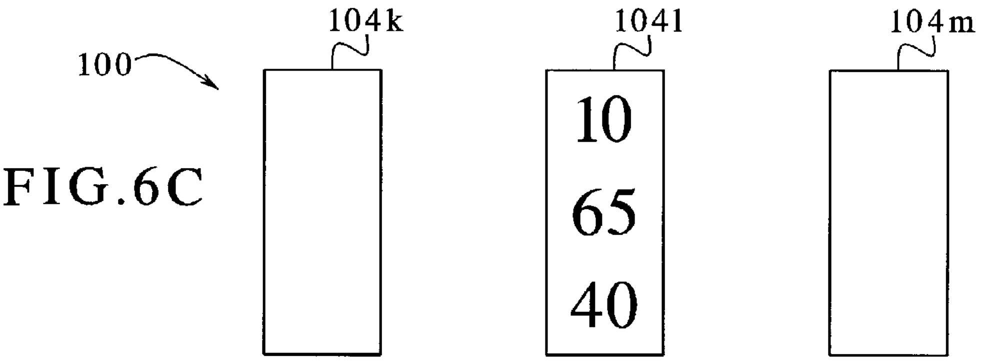
Figure 6D:
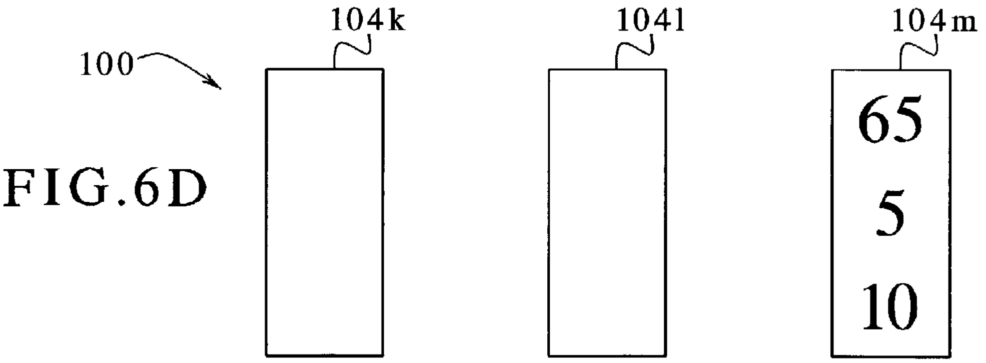

As shown in FIG. 6C, the player chose to save the highest value which was value forty. The gaming device then included this value forty in value sets 104*l* and 104*m*. When the player selected value set 104*l*, the gaming device revealed values ten, sixty-five and forty. Again, the player chose to save the highest value which was value sixty-five and, as shown in FIG. 6D, the player made a final selection of value set 104*m*. Here, the gaming device provided the player with values sixty-five, five and ten.

It should be appreciated that the present invention can be adapted to enable the player to make selections or to enable the gaming device to make selections of value sets for the player. The gaming device may do so based upon a determination made prior to the initiation of the bonus round or during the bonus round. Furthermore, the present invention can be adapted so that the player need not save a value prior to making an additional selection.

The bonus scheme of the present invention provides increased player involvement in accept and reject-type bonus schemes. The bonus scheme includes a plurality of value sets, preferably one of which a player may select. Each value set includes a plurality of values. When a player chooses a value set, a player can either accept the sum of the values associated with that value set, or the player can save preferably one of the values in that value set and choose a different value set which includes the saved value(s). This type of bonus scheme increases player involvement and the player's sense of control in determining the ultimate award provided to a player.

In one embodiment illustrated in FIGS. 7 to 10, the game or bonus scheme of the present invention includes a plurality of selectable symbol sets 200*a* to 200*f*. The display device preferably displays all of the symbols sets 200*a* to 200*f* to the player simultaneously. Here, each symbol set 200*a* to 200*f* is a series or string of letters which preferably forms a word or phrase. It should be appreciated, however, that the symbol sets of this embodiment can include any suitable symbol array, such as a pattern, chain, series or string of distinct symbols of any type.

Each of the symbol sets 200*a* to 200*f* is associated with a value set which includes a plurality of values. Preferably, these values serve as the basis for an award associated with each of the value sets. Each of the symbol sets 200*a* to 200*f* also includes a plurality of mask symbols 202 which, in this embodiment, are shown as various letters. In one embodiment, the mask symbols 202 initially conceal or mask all of the values in the values sets. In alternative embodiments, the mask symbols conceal or mask one or more (but not all) of the values in one or more of the symbol sets.

Figure 7:
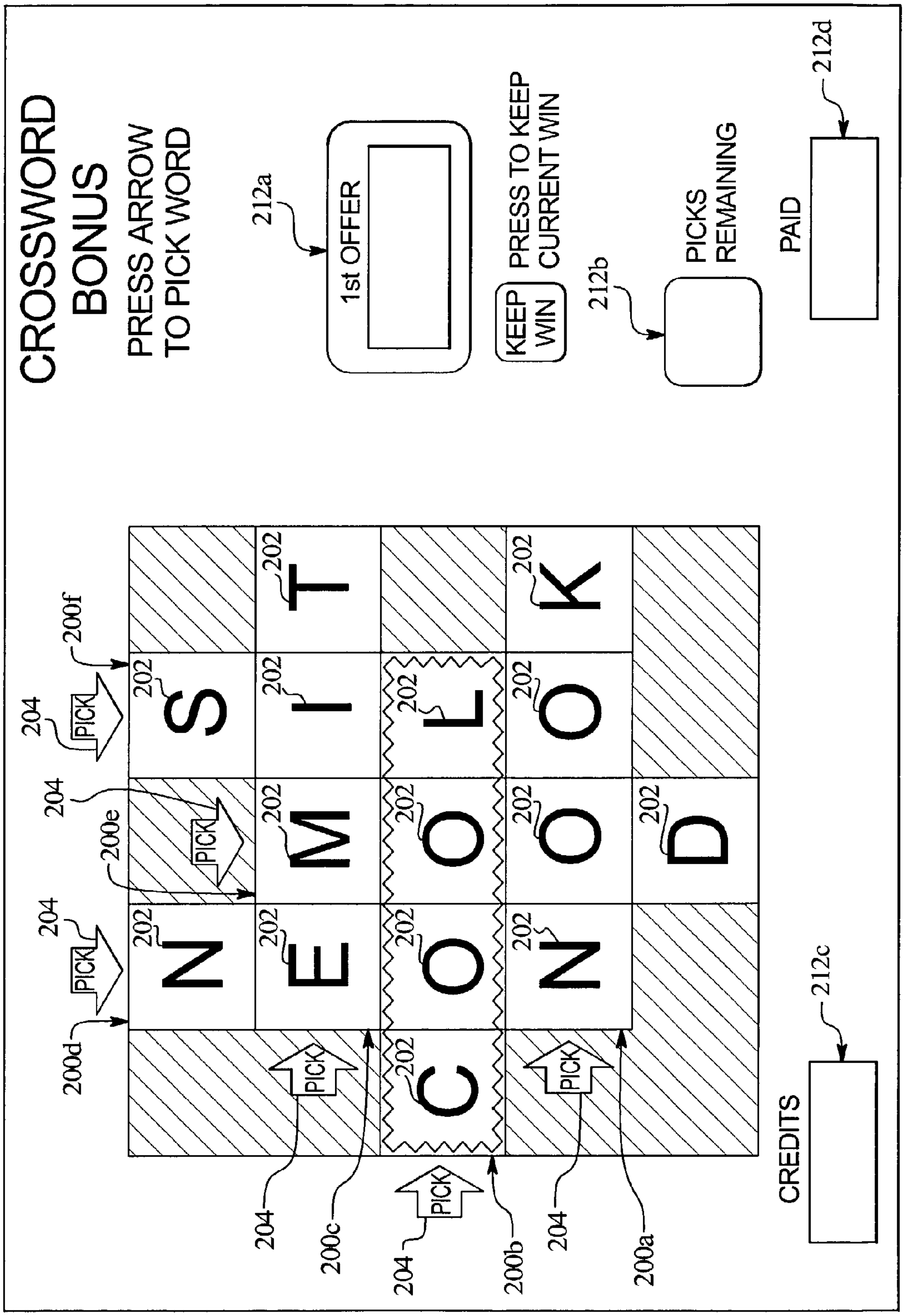
FIGS. 7 through 10 are example screen shots which illustrate one embodiment of the present invention.
Figure 8:
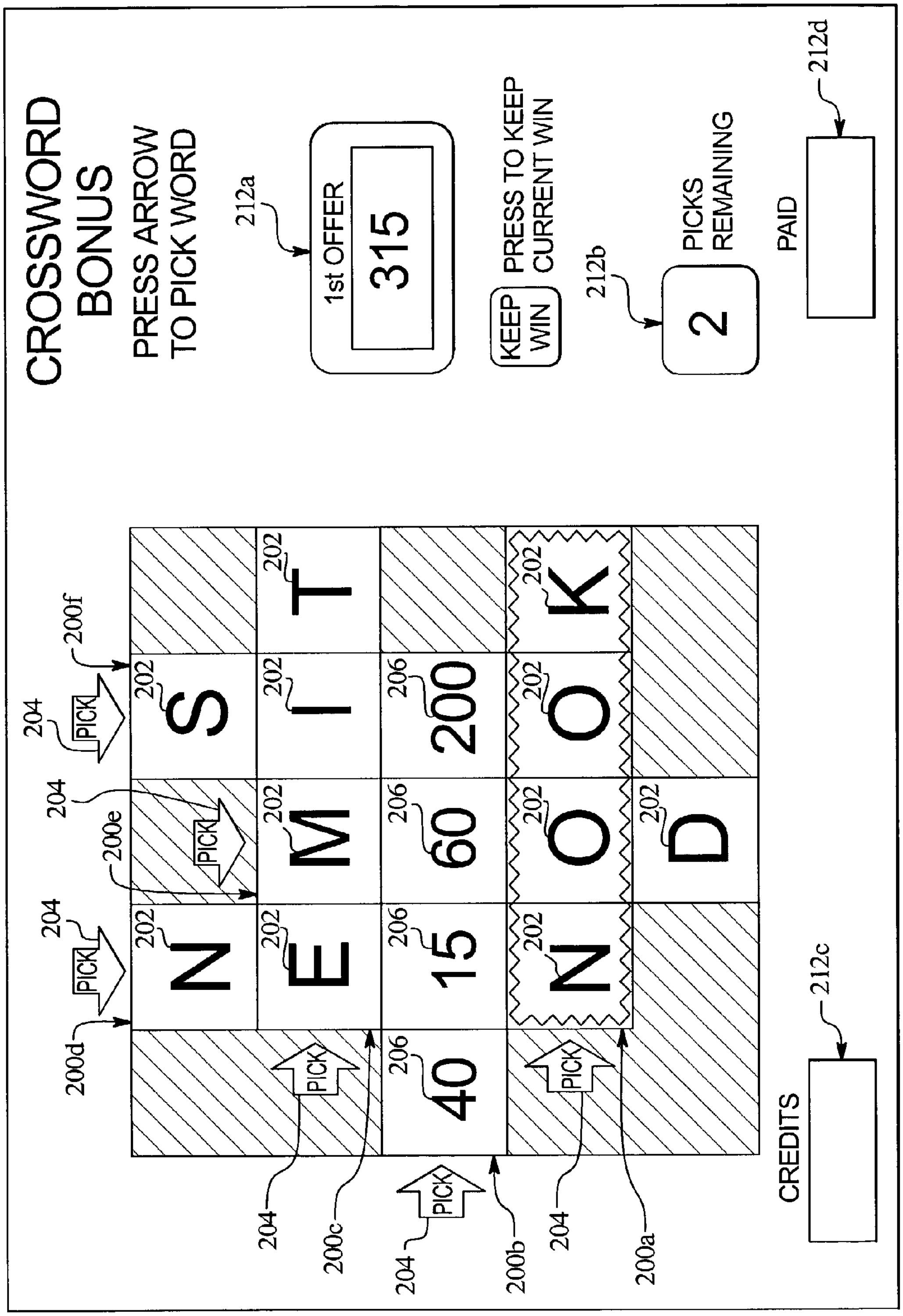

In operation of one example, the display device initially displays all of the symbol sets 200*a* to 200*f* to the player, as illustrated in FIG. 7. By using a symbol set selection input device, the player can choose one of the symbol sets 200*a* to 200*f*. Preferably, a suitable indicator 204 assists the player in selectively indicating and choosing desired symbol sets 200*a* to 200*f*. In this example, the player first selects symbol set 200*a*. Selections made by the player are illustrated herein with a zig-zag line surrounding the selected symbol set. The display device then removes the mask symbols 202 in value set 200*b*, revealing the values 206 associated with such mask symbols 202, as illustrated in FIG. 8. The gaming device processor provides the player with the option of accepting the sum of values 206, which is three hundred fifteen, or rejecting this first offer and making another selection of any of the remaining symbol sets 200*a* or 200*c* to 200*f*.

Figure 9:
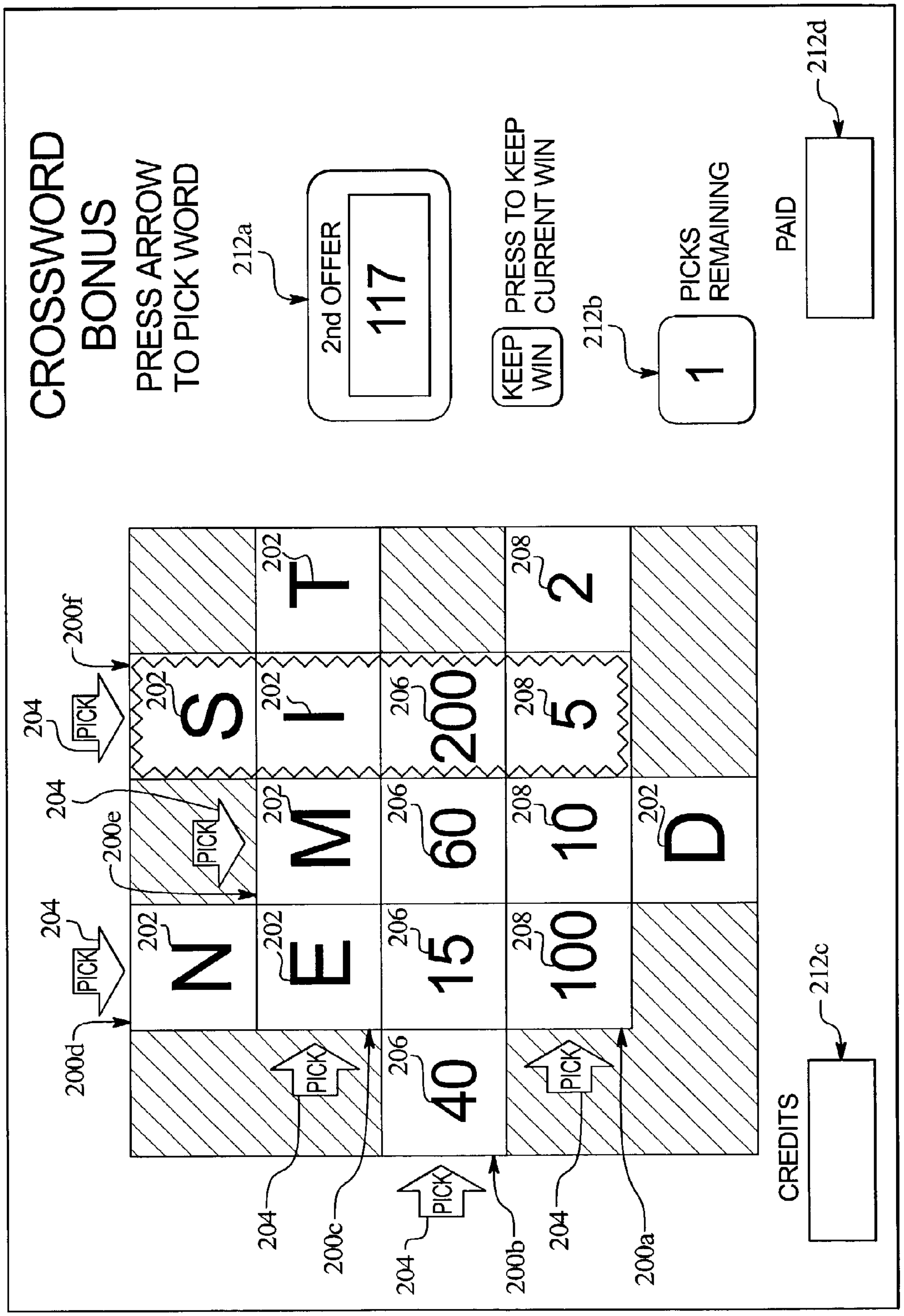

With continued reference to FIG. 8, the player rejects the first offer. The second selection by the player may or may not include one of the values 206. In this case, the player selects the symbol set 200*a* which does not include any of the values 206. As shown in FIG. 9, the gaming device processor then reveals values 208 and provides the player with the option of accepting the sum of values 208, which is one hundred seventeen, or rejecting this second offer and making another selection of any of the remaining symbol sets 200*c* to 200*f*.

Figure 10:
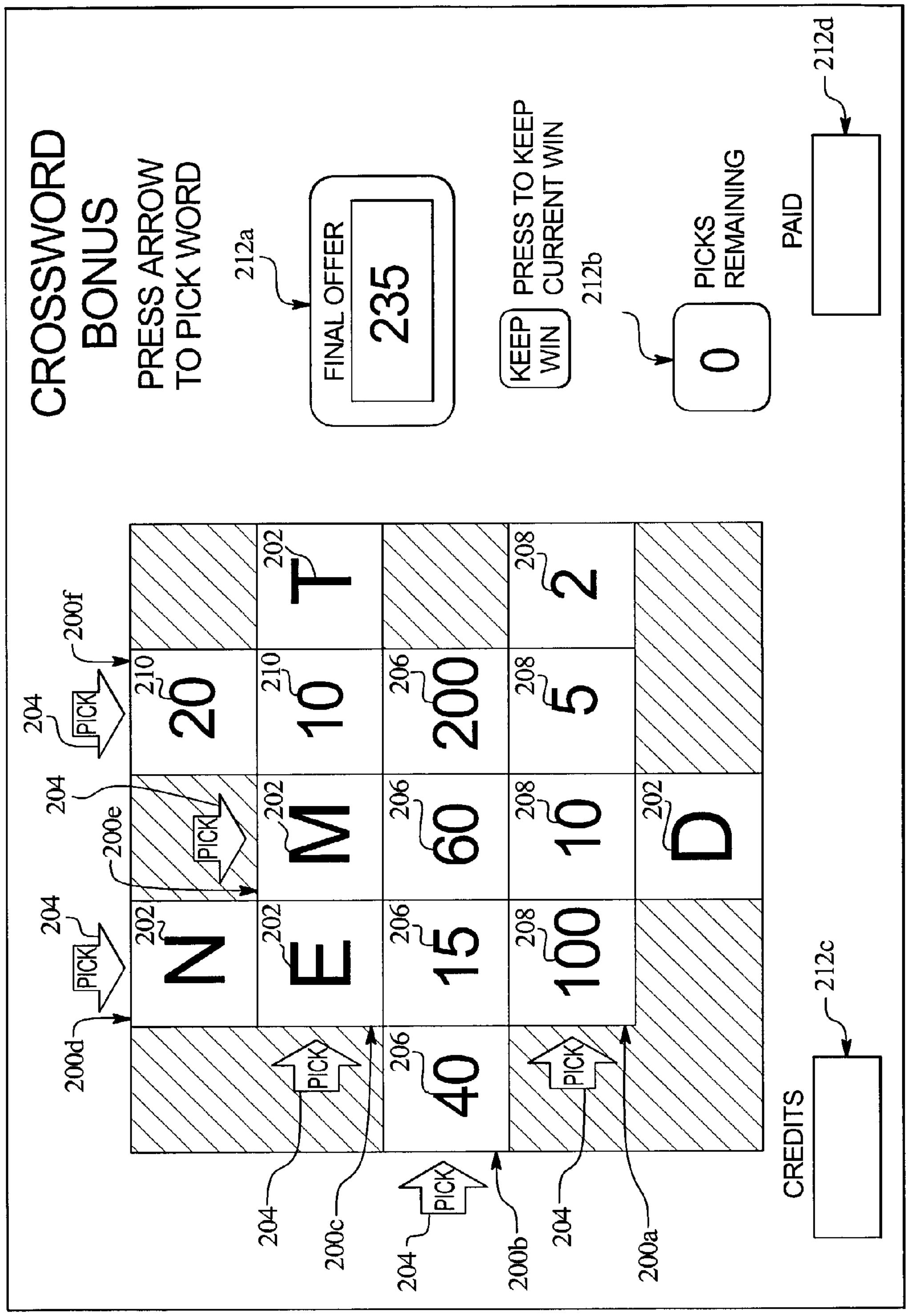

With continued reference to FIG. 9, the player rejects the second offer and selects symbol set 200*f*. The display device then unmasks and reveals values 210 as shown in FIG. 10. With the third offer being the last one, the gaming device processor provides the player with an award which is the sum of the values in symbol set 200*f* (values 210, value 206 and value 208) which is two hundred thirty-five.

It should be appreciated that in this embodiment, the gaming device does not have to reveal all of the values associated with a selected symbol set. The gaming device can reveal or unmask one or more of the values associated with one or more initially displayed symbol sets and/or a selected symbol set, and the player can use this information to decide whether to accept or reject an offer. Thus, in this alternative embodiment, the player may need to accept or reject an offer without knowing the full value of the offer because a part, component or one of the values of the offer are not displayed to the player. After the final offer, the display device preferably reveals all of the values in the symbol sets 200*a* to 200*e* at which time the game terminates.

It is preferable that the display device displays a plurality of indicators 212*a* to 212*d* for the player. Offer indicator 212*a* indicates the particular offer which the player may accept or reject. Selection quantity indicator 212*b* indicates the quantity of selections or picks which are available to the player during the game. Credit indicator 212*c* indicates the player's balance of credits, and payment indicator 212*d* indicates the payment due to the player.

Figure 11:
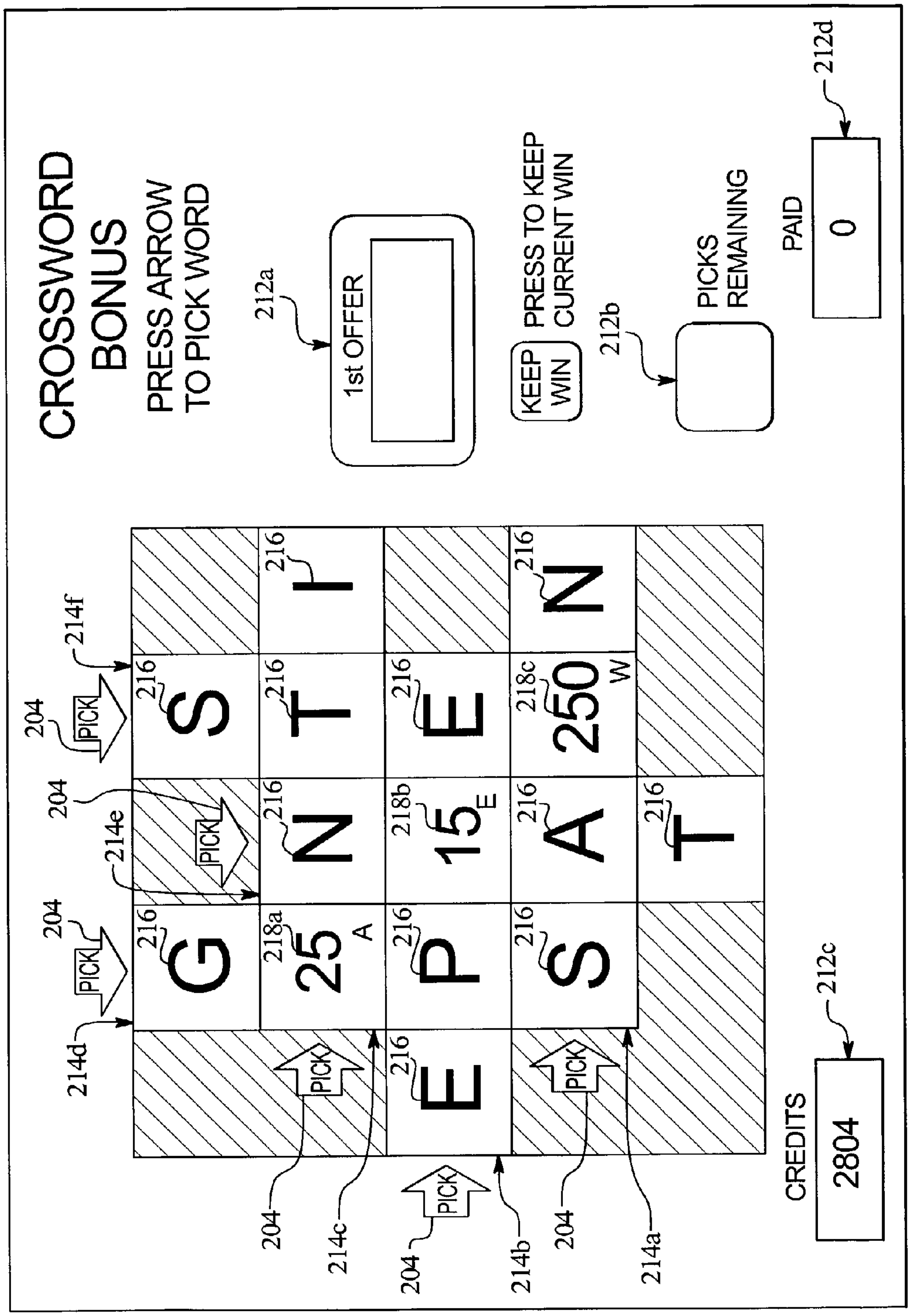
FIGS. 11 through 13 are example screen shots which illustrate another embodiment of the present invention.
Figure 12:
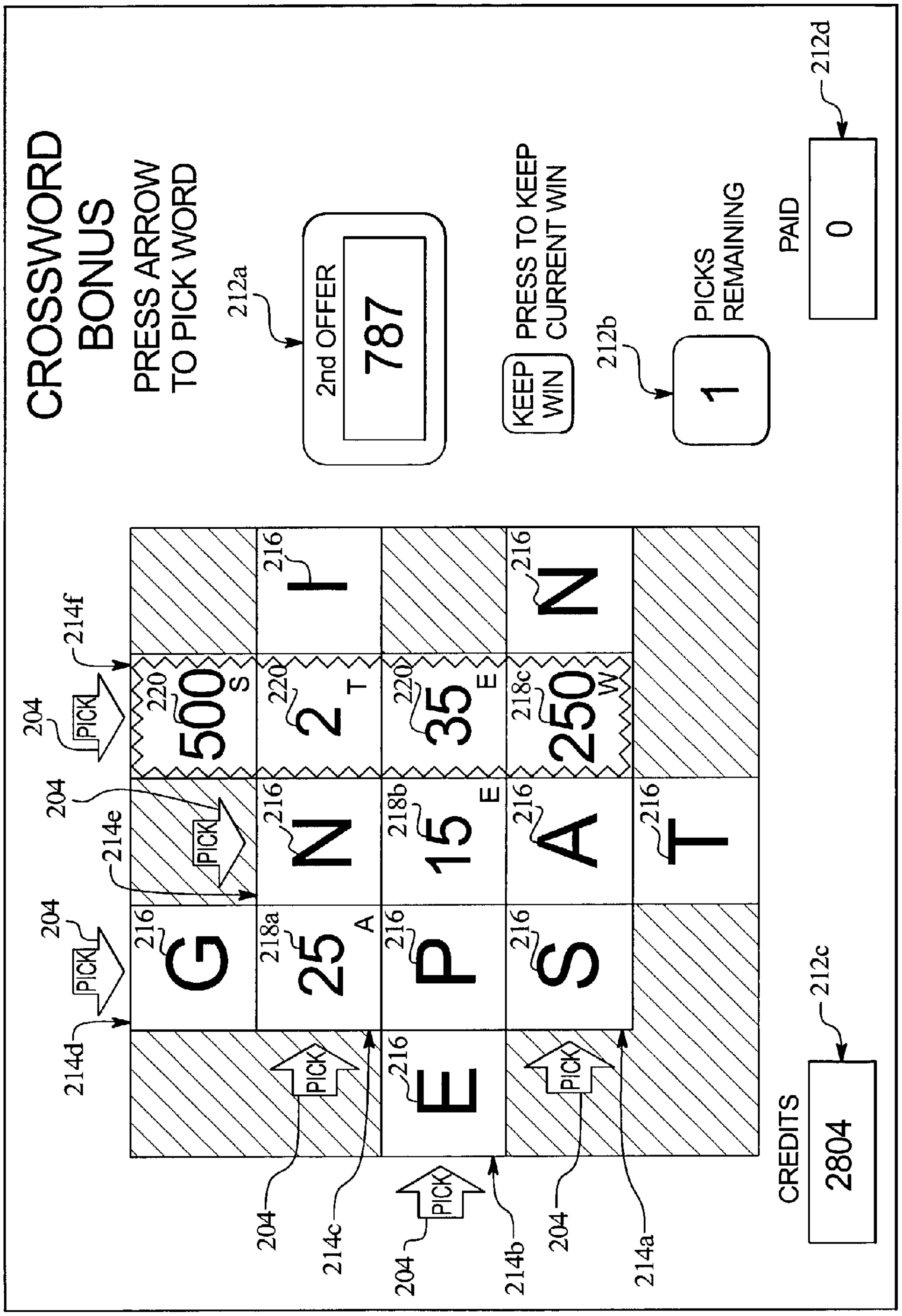
Figure 13:
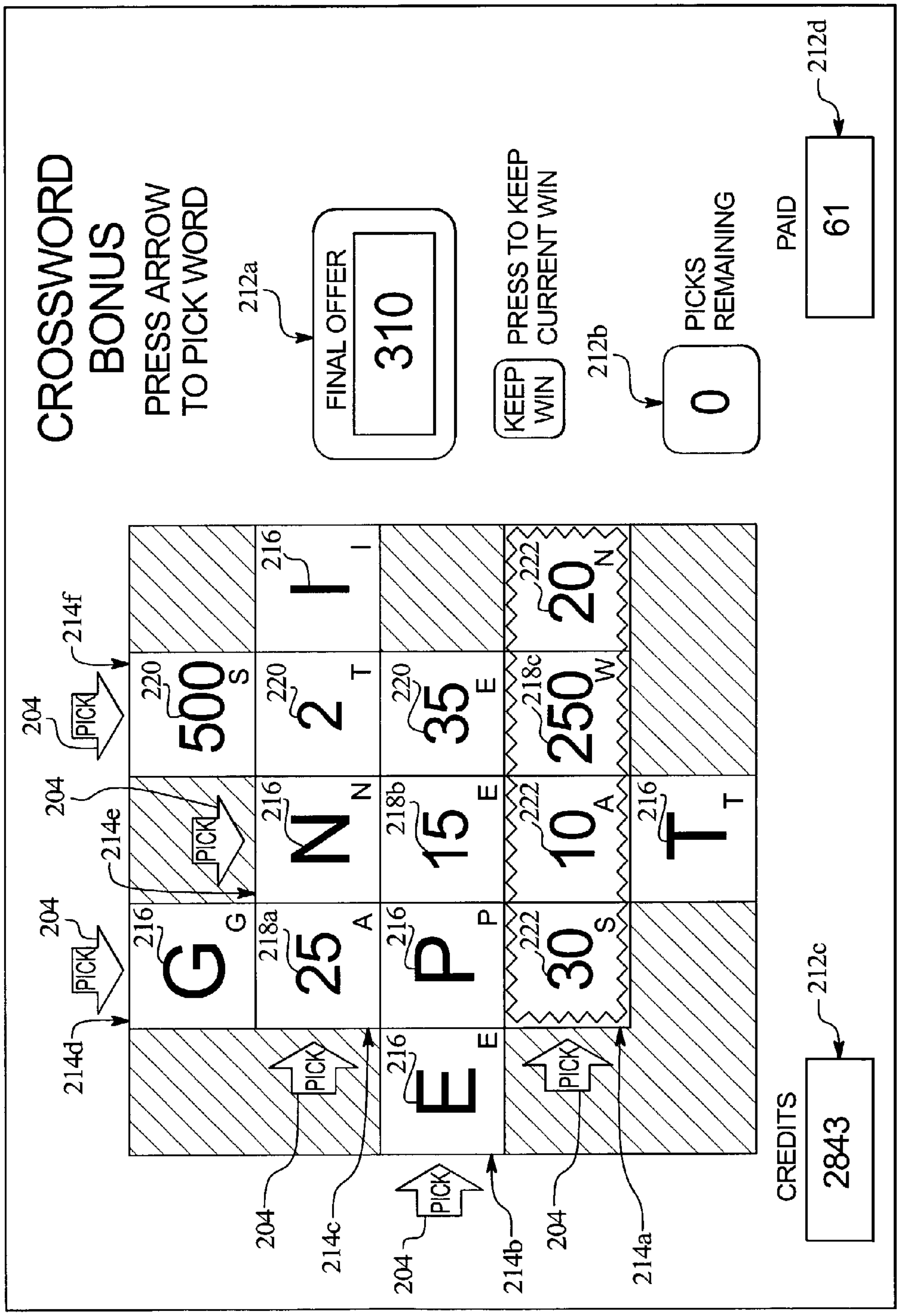

In another embodiment illustrated in FIGS. 11 to 13, the bonus scheme of the present invention includes a plurality of selectable symbol sets 214*a* to 214*f*. Each of the symbol sets 214*a* to 214*f* is associated with a value set which includes a plurality of values. Preferably, these values serve as the basis for an award associated with each of the value sets. Each of the symbol sets 214*a* to 214*f* also includes a plurality of mask symbols 216 which, in this embodiment, are shown as various letters.

The mask symbols 216 conceal or mask only certain values in the values sets. In one embodiment, at least one of the values in each of the values sets is initially unmasked or revealed to the player at the beginning of the game. In this example, values 218*a* to 218*c* are displayed to the player prior to the player's first selection of a symbol set 214*a* to 214*f*.

In operation of one example, the display device displays all of the symbol sets 214*a* to 214*f* to the player, as illustrated in FIG. 11. By using an input device, the player can choose one of the symbol sets 214*a* to 214*f*. In this example, the player first selects symbol set 214*f*. The display device then removes the mask symbols 216 in symbol set 200*f*, revealing the values 220 associated with such mask symbols 202, as illustrated in FIG. 12. The gaming device processor provides the player with the option of accepting the sum of value 218*c* and values 220, which is seven hundred eighty-seven, or rejecting this first offer and making another selection of any of the remaining symbol sets 214*a* to 214*e*.

As illustrated in FIG. 13, the player rejects the first offer and selects symbol set 214*a*. This second and final selection by the player does not have to include any of the values 218*c* or 220 in symbol set 200*f*. In this case, the player selects the symbol set 214*a* which includes value 218*c*. The gaming device processor then reveals values 222 and provides the player with the sum of values 218*c* and 222, which is three hundred ten. Preferably, the display device then reveals all of the values in the symbol sets 214*a* to 214*e* at which time the game terminates.

It should be appreciated that in this embodiment, the gaming device does not have to reveal all of the values associated with a selected symbol set. The gaming device can reveal or unmask one or more of the values associated with a selected symbol set, and the player can use this information to decide whether to accept or reject an offer.

Certain symbols are only included in one symbol set while other symbols are included in multiple symbol sets. For example, as illustrated in FIG. 8, the "K" symbol 202 in symbol set 200*a* is included in no symbol set other than symbol set 200*a*. The particular configuration of the symbol sets can affect which symbols are included in multiple symbol sets and which symbols are only included in a single symbol set.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. A gaming device comprising:

a plurality of symbol sets, each symbol set including a plurality of symbols;

a value associated with at least one of the symbols in each of the symbol sets;

at least one award associated with each of the symbols sets, the award for each symbol set including at least one of the values associated with at least one of the symbols in said symbol set;

a display device operable to simultaneously display the symbol sets to a player;

a symbol set selection input device; and a processor in communication with the display device and the symbol set selection input device, operable to:

(a) enable the player to initially select a symbol set, (b) cause the display device to reveal the value associated with at least one of the symbols in the initially selected symbol set, and (c) provide the player with an option to obtain one of:

(i) the award associated with the initially selected symbol set, and (ii) the award associated with a different one of the symbol sets by selecting a different one of the symbol sets.

2. The gaming device of claim 1, wherein the award associated with each of the symbol sets is represented by at least one of the symbols included in said symbol set.

3. The gaming device of claim 1, wherein the award associated with each of the symbol sets is represented by at least one of the symbols included in said symbol set, the at least one symbol representing a value higher than any value represented by any of the other symbols in said symbol set.

4. The gaming device of claim 1, wherein the each of the values has an identical position as one of the symbols, whereby each of the symbols removably masks one of the values.

5. The gaming device of claim 1, which includes a value associated with each of the symbols in each of the symbol sets.

6. The gaming device of claim 5, wherein the award associated with each of the symbol sets is a sum of a plurality of the values associated with the symbols in said symbol set.

7. The gaming device of claim 5, wherein the award associated with each of the symbol sets is a sum of each of the values associated with the symbols in said symbol set.

8. The gaming device of claim 5, wherein the award associated with each of the symbol sets is greater than the at least one values included within said award.

9. A gaming device comprising:

a plurality of sets, each set including a plurality of symbols;

at least one value associated with at least one of the symbols in each one of the sets;

at least one award associated with each of the sets, the award including the at least one value associated with the at least one symbol in said set;

a display device operable to enable a player to simultaneously view the sets;

an input device; and a processor in communication with the display device and the input device, operable to:

(a) enable the player to initially select one of the displayed sets, (b) cause the display device to reveal at least part of the award associated with the initially selected set, and (c) provide the player with an option to obtain one of:

(i) the part of the award associated with said initially selected and (ii) at least part of the award associated with a different set by selecting any of the other displayed sets, including any of the displayed sets which include at least one of the symbols of the initially selected set.

10. The gaming device of claim 9, wherein the award associated with each of the sets is greater than the at least one value included within said award.

11. The gaming device of claim 9, wherein the award associated with each of the sets is a sum of a plurality of values associated with the symbols in said set.

12. The gaming device of claim 9, wherein the award associated with each of the sets is a sum of each of a plurality of values associated with the symbols in said set.

13. The gaming device of claim 9, which includes a configuration associated with each of the sets.

14. The gaming device of claim 13, wherein each of the configurations has at least one displayed overlapping portion in common with one of the other configurations.

15. The gaming device of claim 14, which includes one symbol included in a plurality of the sets, said symbol associated with said overlapping portion.

16. The gaming device of claim 14, wherein each of the configurations has at least one intersecting portion in common with one of the other configurations.

17. The gaming device of claim 16, which includes one symbol included in a plurality of the sets, said symbol associated with said intersecting portion.

18. A gaming device comprising:

a plurality of symbol sets, each of the symbol sets including a plurality of symbols, at least one of which is in common with another symbol set;

a value associated with each of the symbols;

a display device operable to simultaneously display the symbol sets to a player;

an input device which enables the player to select the symbol sets; and a processor in communication with the display device and the input device, operable to:

(a) enable the player to initially select one of the symbol sets, (b) cause the display device to reveal at least one of the values associated with one of the symbols in the initially selected symbol set, and (c) provide the player with an option to obtain one of:

(i) an award associated with said initially selected symbol set, said award including at least one of the values associated with at least one of the symbols in the initially selected symbol, and (ii) another award associated with a different symbol set by:

(ix) selecting a different symbol set which includes at least one of the symbols in the initially selected symbol set; or (y) selecting a different symbol set which does not include any of the symbols in the initially selected symbol set, said award including at least one of the values associated with at least one of the symbols in the different symbol set.

19. The gaming device of claim 18, wherein the awards associated with the initially selected symbol set and the different symbol set are each greater than the at least one values included within said award.

20. The gaming device of claim 18, wherein the award associated with each of the symbol sets is a sum of the values associated with a plurality of the symbols included in said symbol set.

21. The gaming device of claim 18, wherein the award associated with each of the symbol sets is a sum of the values associated with each of the symbols included in said symbol set.

22. The gaming device of claim 18, wherein the award associated with each of the symbol sets is one of the values associated with one of the symbols included in said symbol set, the value having a higher value than all other values associated with all of the other symbols in said symbol set.

23. The gaming device of claim 18, wherein at least one of the symbols is included in only one of the symbol sets.

24. The gaming device of claim 18, which includes a grid defining locations for the symbol sets.

25. The gaming device of claim 24, wherein the grid defines each of the symbol sets in a configuration.

26. The gaming device of claim 25, which includes overlapping configurations.

27. The gaming device of claim 25, which includes intersecting configurations.

28. The gaming device of claim 25, wherein the configurations are selected from the group consisting of lines, curves, partial circles, full circles, ovals and polygons.

29. The gaming device of claim 25, which includes a selectable symbol associated with each of the configurations.

30. A gaming device comprising:

a plurality of symbol sets, each of the symbol sets including a plurality of symbols, wherein at least one but not all of said symbols of one of the symbol sets is shared with another one of the symbol sets;

a plurality of values associated with the symbols;

a display device operable to simultaneously display the symbol sets to a player;

an input device which enables the player to select the symbol sets; and a processor operable with the display device and the input device to:

(a) enable the player to initially select one of the symbol sets, (b) cause the display device to reveal at least one of the values associated with one of the symbols in the initially selected symbol set, and (c) provide the player with an option to obtain one of:

(i) an award associated with said initially selected symbol set, said award including at least one of the values associated with at least one of the symbols in the initially selected symbol set, and (ii) an award associated with a different symbol set by:

(x) selecting a different symbol set which includes at least one of the symbols in the initially selected symbol set; or (y) selecting a different symbol set which does not share any symbol with the initially selected symbol set, said award including at least one of the values associated with at least one of the symbols in the different symbol set.

31. The gaming device of claim 30, wherein the awards associated with the initially selected symbol sets and the different symbol set are each greater than the at least one values included within said award.

32. The gaming device of claim 30, wherein the award associated with each of the symbol sets is a sum of the values associated with a plurality of the symbols of said symbol set.

33. The gaming device of claim 30, wherein the award associated with each of the symbol sets is a sum of the values associated with each of the symbols of said symbol set.

34. The gaming device of claim 30, wherein at least one of the symbols is included in only one of the symbol sets.

35. The gaming device of claim 30, wherein at least one but not all of said symbols of a plurality of the symbol sets is shared with another one of the symbol sets.

36. The gaming device of claim 30, wherein at least one but not all of said symbols of each of the symbol sets is shared with another one of the symbol sets.

37. The gaming device of claim 30, wherein a plurality but not all of said symbols of one of the symbol sets are shared with at least one other of the symbol sets.

38. The gaming device of claim 30, wherein a plurality but not all of said symbols of a plurality of symbol sets are shared with at least one other of the symbol sets.

39. The gaming device of claim 30, wherein the at least one shared symbol is usable to form: (a) one word associated with one of the symbol sets; and (b) a different word associated with another one of the symbol sets.

40. The gaming device of claim 30, wherein a plurality but not all of said symbols of each of the symbol sets are shared with at least one other of the symbol sets.

41. A method of operating a gaming device, said method comprising the steps of:

associating a plurality of values with a plurality of symbols in a plurality of sets of symbols and simultaneously displaying the plurality of sets of symbols to a player without displaying the value associated with at least one of the symbols in each of the sets;

providing an award associated with each of the sets, wherein the award associated with each set includes the value associated with at least one of the symbols in said set;

enabling the player to initially select one of the sets;

revealing the values in the initially selected set; and providing the player with an option to obtain one of:

(a) the award associated with said initially selected set, and (b) the award associated with a different set by selecting a different one of the sets.

42. The method of claim 41, wherein the step of simultaneously displaying the plurality of sets of symbols to the player without displaying the value associated with at least one of the symbols in each of the sets, includes the step of masking a plurality of the values, each value masked by one of the symbols.

43. The method of claim 41, wherein the award associated with each set includes the sum of a plurality of the values associated with the symbols in said set.

44. The method of claim 41, wherein the award associated with each of the set includes the sum of each of the values associated with the symbols in said set.

45. The method of claim 41, wherein the award associated with each set includes the value associated with one of the symbols in the set having a higher value than the values associated with the other symbols in said set.

46. The method of claim 41, wherein the symbol sets are displayed in a grid.

47. The method of claim 46, wherein each set in the grid is displayed in a configuration selected from the group consisting of a line, curve, partial circle, full circle, oval and polygon.

48. The method of claim 47, which includes the step of displaying at least one portion of at least one of the configurations which overlaps with a portion of another configuration.

49. The method of claim 48, which includes the step of associating at least one of the values with said portion.

50. The method of claim 47, which includes the step of displaying at least one portion of at least one of the configurations which intersects with a portion of another configuration.

51. The method of claim 50, which includes the step of associating at least one of the masked values with said portion.

52. The method of claim 41, which includes the step of controlling the game through a data network.

53. The method of claim 41, which includes the step of controlling the game through an internet.

54. The method of claim 41, which includes the step of storing on a data network a memory device for controlling the game.

55. A method of operating a gaming device, said method comprising the steps of:

simultaneously displaying a plurality of sets of symbols to a player;

associating a value with at least one of the symbols in each of the sets;

providing an award associated with each of the sets, each one of the award including at least one of the values;

enabling the player to initially select one of the sets;

revealing at least part of the award associated with the selected set;

providing the player with an option to obtain one of:

(a) the player to obtain the award associated with said initially selected set, and (b) the award associated with a different set by selecting any of the other displayed sets, including any of the displayed sets which include at least one of the symbols of the initially selected set; and repeating steps (a) through (b) at least once.

56. The method of claim 55, wherein the awards associated with the initially selected set and the different set are each greater than the at least one value included within said award.

57. The method of claim 55, wherein the award associated with each of the sets is a sum of the values associated with the symbols in said set.

58. The method of claim 55, wherein the award associated with each of the sets is a sum of each of the values associated with the symbols in said set.

59. The method of claim 55, wherein the award associated with each of the sets includes the value associated with one of the symbols in the set having a higher value than the values associated with the other symbols in said set.

60. The method of claim 55, which includes the step of controlling the game through a data network.

61. The method of claim 55, which includes the step of controlling the game through an internet.

62. The method of claim 55, which includes the step of storing on a data network a memory device for controlling the game.

63. A method of operating a gaming device, said method comprising the steps of:

simultaneously displaying a plurality of sets of symbols to a player;

associating a value with at least one of the symbols in each of the sets and revealing at least one value associated with one of the symbols in at least one of the sets;

providing an award associated with each of the sets, each one of the awards including at least one of the values;

enabling the player to initially select one of the sets;

revealing at least one of values associated with the symbols of the selected set; and providing the player with an option to obtain one of:

(a) the award associated with said selected set, and (b) the award associated with a different set by selecting any of the other displayed sets, including any of the displayed sets which include at least one of the symbols of the initially selected set.

64. The method of claim 63, which includes repeating the enabling, revealing and providing steps at least once.

65. The method of claim 63, which includes revealing at least one value associated with one of the symbols in a plurality of the sets prior to enabling the player to pick one of the sets.

66. The method of claim 63, which includes revealing at least one value associated with one of the symbols in each of the plurality of the sets prior to enabling the player to pick one of the sets.

67. The method of claim 63, wherein the award associated with each of the sets is greater than the at least one of the values included within said award.

68. The method of claim 63, wherein the award associated with each of the sets includes the sum of a plurality of the values associated with the symbols in said set.

69. The method of claim 63, wherein the award associated with each of the sets includes the sum of each of the values associated with the symbols in said set.

70. The method of claim 63, which includes the step of controlling the game through a data network.

71. The method of claim 63, which includes the step of controlling the game through an internet.

72. The method of claim 63, which includes the step of storing on a data network a memory device for controlling the game.

* * * * *

UNITED STATES PATENT AND TRADEMARK OFFICE

CERTIFICATE OF CORRECTION

PATENT NO. : 7,229,350 B2 
APPLICATION NO. : 10/231639
DATED : June 12, 2007
INVENTOR(S) : Anthony J. Baerlocher et al.

It is certified that error appears in the above-identified patent and that said Letters Patent is hereby corrected as shown below:

IN THE SPECIFICATION:

Column 4, Line 9, change "Sifting" to --sitting--.
Column 9, Line 28, change "200a" to --200b--.

IN THE CLAIMS:

Claim 55, Column 15, Line 13 delete the phrase "the player to obtain".

Signed and Sealed this

Eighteenth Day of March, 2008

JON W. DUDAS
*Director of the United States Patent and Trademark Office*